United States Patent
Hengel et al.

(10) Patent No.: US 8,636,527 B2
(45) Date of Patent: Jan. 28, 2014

(54) ELECTRICAL CONNECTION ASSEMBLY

(75) Inventors: Christian Hengel, Hochstatt (FR);
Jérôme Feron, Waldighoffen (FR);
Michel Chabirand, Bollwiller (FR);
Alain-Christophe Tiberghien, Sevrier (FR); Philippe Guin, Annecy (FR)

(73) Assignee: Multi-Holding AG, Allschwil (CH)

( * ) Notice: Subject to any disclaimer, the term of this patent is extended or adjusted under 35 U.S.C. 154(b) by 84 days.

(21) Appl. No.: 13/154,514

(22) Filed: Jun. 7, 2011

(65) Prior Publication Data
US 2011/0300738 A1 Dec. 8, 2011

(30) Foreign Application Priority Data

Jun. 7, 2010 (FR) ...................................... 10 54447

(51) Int. Cl.
*H01H 13/44* (2006.01)
(52) U.S. Cl.
USPC ............................ 439/141; 439/378; 439/248
(58) Field of Classification Search
USPC ................... 439/34, 141, 374, 378, 380, 381, 439/246–248, 379
See application file for complete search history.

(56) References Cited

U.S. PATENT DOCUMENTS

| | | | |
|---|---|---|---|
| 3,491,326 A * | 1/1970 | Pfister et al. ................... | 439/141 |
| 5,462,439 A * | 10/1995 | Keith ............................... | 439/34 |
| 5,820,416 A | 10/1998 | Carmichael | |
| 5,838,857 A * | 11/1998 | Niekrasz ........................ | 439/139 |
| 7,041,918 B1 | 5/2006 | Wu | |
| 2007/0032112 A1 | 2/2007 | Renautt | |
| 2011/0300751 A1* | 12/2011 | Wittenberg et al. .......... | 439/668 |

FOREIGN PATENT DOCUMENTS

| | | |
|---|---|---|
| GB | 2264201 A | 8/1993 |
| WO | 2007045792 A2 | 4/2007 |

OTHER PUBLICATIONS

International search report for appliation FR1054447, filed Jun. 7, 2010.

* cited by examiner

*Primary Examiner* — Felix O Figueroa
(74) *Attorney, Agent, or Firm* — Dowell & Dowell, PC

(57) ABSTRACT

An electrical connection assembly includes a female element having at least one electrical contact and a male element to be inserted in the female element and which includes a plug and a sleeve that surrounds and is movable relative to the plug and at least one electrical contact is carried by the plug and is electrically engageable to the electrical contact of the female element. An external surface of the sleeve has at least two stages with diameters which are smaller in a direction toward a free end of the male element and the female element has a body with an internal surface having at least two stages with diameters which are larger in a direction toward a mouth of the female element and such that the at least two stages of the external and internal surfaces seat with one another when the male element is inserted into the female element.

19 Claims, 8 Drawing Sheets

ELECTRICAL CONNECTION ASSEMBLY

BACKGROUND OF THE INVENTION

1. Field of the Invention

The present invention concerns an electrical connection assembly.

WO-A-2007/045792 describes a charging station and an electric vehicle in which the electric motor of the vehicle is powered by an electric battery charged when the vehicle is stationary near a charging station. The electrical connection between the vehicle and the charging station is effected by connection means of the charging station cooperating with connection means of the vehicle.

2. Brief Description of the Related Art

GB-A-2 264 201 discloses an electrical connection assembly which comprises a male element comprising two conductive electrical pins and a female element comprising two conductive receptacles intended to receive the electrical pins. A protection element covers the pins and is able to slide along the pins, inside a body of the male element. On connecting the male element with the female element, the female element pushes back the protection element, which frees the electric pins that are engaged in the receptacles of the female element. During connection, the connection assembly does not allow guidance without jamming of the male element in the female element in the event of faulty alignment of the male element relative to the female element.

SUMMARY OF THE INVENTION

The object of the present invention is to ensure when charging the vehicle fast, reliable, safe and automatic connection and disconnection of the vehicle and the charging station, despite defective positioning of the connection means of the vehicle relative to the connection means of the charging station that result, in particular, from variation of the stopping position of the vehicle relative to the charging station and variation of the load of the vehicle.

To this end, the invention concerns an electrical connection assembly, including a female element which includes at least one electrical contact, and a male electrical connection element intended to be inserted in the female element, the male element including a plug that extends along a longitudinal axis and a sleeve that surrounds the plug and that is mobile relative to the plug. At least one electrical contact is carried by the plug or the sleeve and intended to be electrically connected to the electrical contact carried by the female element. An exterior connection surface of the electrical contact of the male element is covered by the sleeve or the plug in a first axial position of the sleeve relative to the plug and uncovered in a second axial position of the sleeve relative to the plug. An external radial surface of the sleeve includes at least two stages the diameters of which decrease in the direction toward a free end of the male element. The female element includes a body the internal radial surface of which includes at least two stages the diameters of which increase in the direction toward a mouth of the female element.

According to the invention, the external surfaces of the stages of the sleeve are substantially complementary to the external surfaces of the stages of the internal surface of the body of the female element. Moreover, when the sleeve is fully inserted in the female element the stage of larger diameter of the male element is engaged in the stage of larger diameter of the female element and the stage of smaller diameter of the male element is engaged in the stage of smaller diameter of the female element.

Accordingly, the invention makes it possible, when charging the vehicle, to ensure automatic, fast, reliable and safe connection and disconnection of the vehicle to and from the charging station. Thanks to the cooperation of the stages, the male element is guided into the female element without risk of jamming and the protection of the contacts ensures the safety and the longevity of the invention.

According to advantageous but non-obligatory aspects of the invention, such a male connection element may incorporate one or more of the following features in any technically acceptable combination:

- The male element includes a connecting element for fixing to a support an element forming one end of the plug or the sleeve opposite the free end. Moreover, the connecting element allows movement of the support relative to the plug or the sleeve in at least one direction intersecting the longitudinal axis of the plug. The invention makes it possible to align the male element axially and automatically with the female element, despite defective radial positioning of the male element relative to the female element. Thus positioning errors between the male element and the female element are accommodated, in particular movements of the male element relative to the female element that occur when the elements are connected. The male element may moreover be disconnected from the female element without damage, even if the disconnection movement is not precise.
- The connecting element is an elastically deformable element and may be a spring.
- The connecting element is articulated to the plug or the sleeve.
- The connecting element is hollow to accommodate inside it at least one electrical cable.
- The connecting element extends globally axially along the longitudinal axis of the plug.
- Spring means are adapted to return the connecting element to an initial position in which the connecting element extends globally along the longitudinal axis of the plug.
- The male element includes means disposed axially between the sleeve and an end element of the plug to urge the sleeve axially toward the first position of the sleeve relative to the plug. Thus the sleeve is replaced automatically in its first position.
- The male element includes at least two electrical contacts in the form of parallel annular conductive tracks disposed along the longitudinal axis of the plug.
- At least one electrical contact of the male element is on an external radial surface of the plug. This optimizes the compactness of the male element.
- The plug projects axially from the sleeve and constitutes the free end of the male element. Thus the male element is guided toward the female element without risk of uncovering the contacts, which is favourable for the safety and the longevity of the invention.
- The female element includes a flap mobile axially relative to the body of the female element between a first position in which the flap covers the electrical contact of the female element and a second position in which the electrical contact is uncovered by the flap.
- The flap has an axial side disposed on the same side as the mouth and that is made from a conductive material and one end of the plug at the same end as the free end of the male element includes a conductive part. This feature optimizes the compactness of the invention and promotes safety.
- The connection assembly includes at least one sensor that detects the mobile flap in its second position and/or the sleeve in a configuration fully inserted inside the female element and a control unit is adapted to control the supply of electrical power to at least one electrical contact as a function of the output signal of each sensor. These features contribute to the safety of the invention.

In the fully inserted configuration of the sleeve inside the female element, the axial length over which the stage of larger diameter of the sleeve and the stage of larger diameter of the body of the female element overlap is greater than the axial length over which the stage of smaller diameter of the sleeve and the stage of smaller diameter of the body of the female element overlap. This feature ensures guidance of the male element in the female element without jamming.

One element of the pair of elements comprising the male element and the female element is electrically connected to a battery and the other element of the pair of elements comprising the male element and the female element is electrically connected to a source of electrical power that may be a capacitor or an electrical distribution system.

One of the elements of the pair of elements comprising the male element and the female element is mounted on a vehicle and the other element of the pair of elements comprising the male element and the female element is mounted on a fixed charging station.

The male element or the female element that is mounted on the vehicle includes at least one additional electrical contact connected to a control unit of the vehicle.

BRIEF DESCRIPTION OF TEE DRAWINGS

The invention will be better understood and other advantages thereof will become more clearly apparent in the light of the following description of a male electrical connection element, an electric motor vehicle equipped with such a male element and an electrical connection assembly made up of such a male element and a female element of a fixed charging station, which description is given by way of example only and with reference to the appended drawings, in which.

DESCRIPTION OF TEE PREFERRED EMBODIMENTS

In the following description, the term conductive refers to elements able to transmit an electrical current, for example a metal element. Similarly, the term insulative refers to the elements that do not allow an electric current to pass. Finally, the term axial refers to the longitudinal axis of the element concerned.

Figure 1:
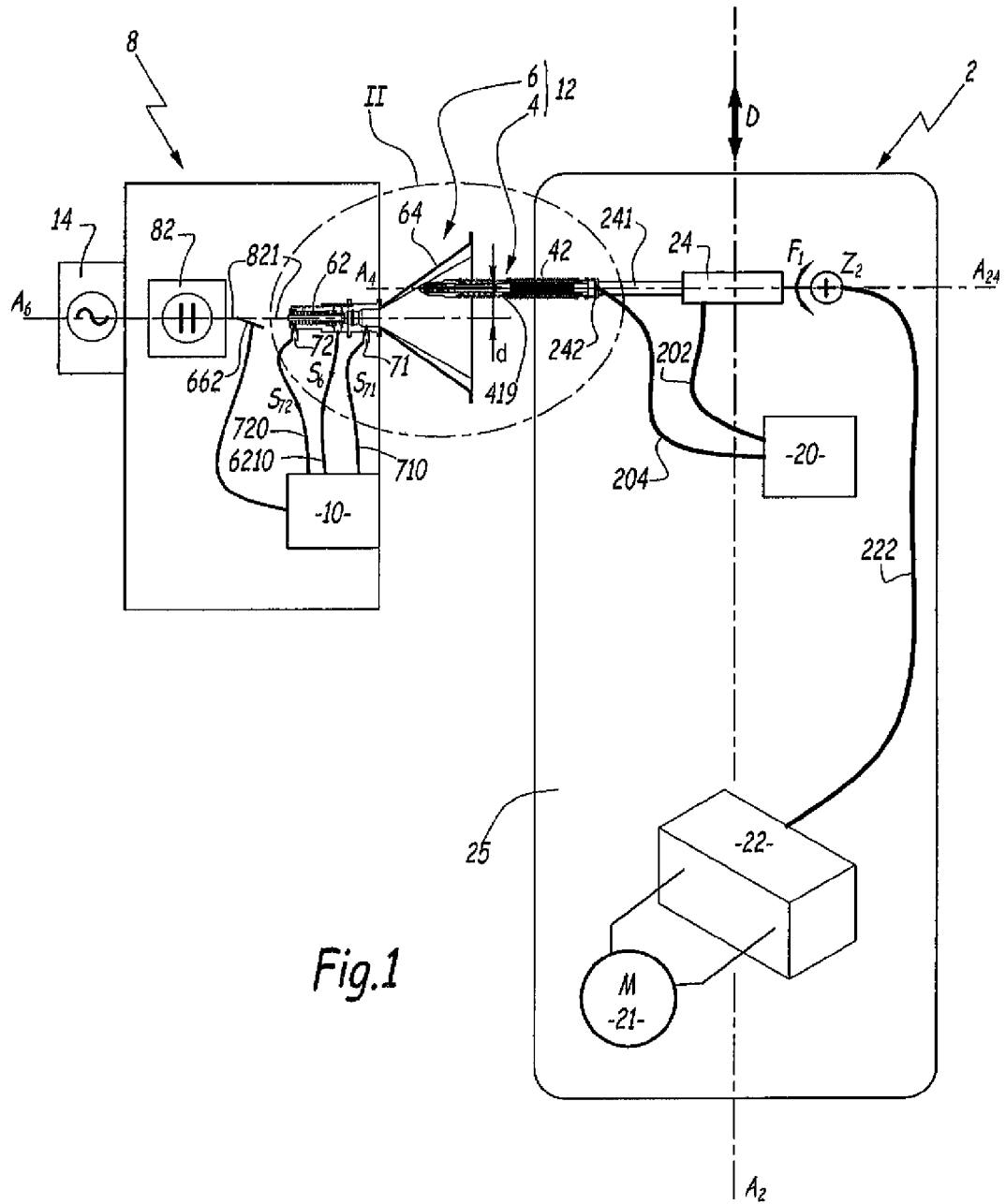
FIG. 1 is a plan view of a bus and a charging station respectively equipped with a male electrical connection element of the invention and a female element of an electrical connection assembly of the invention.
Figure 2:
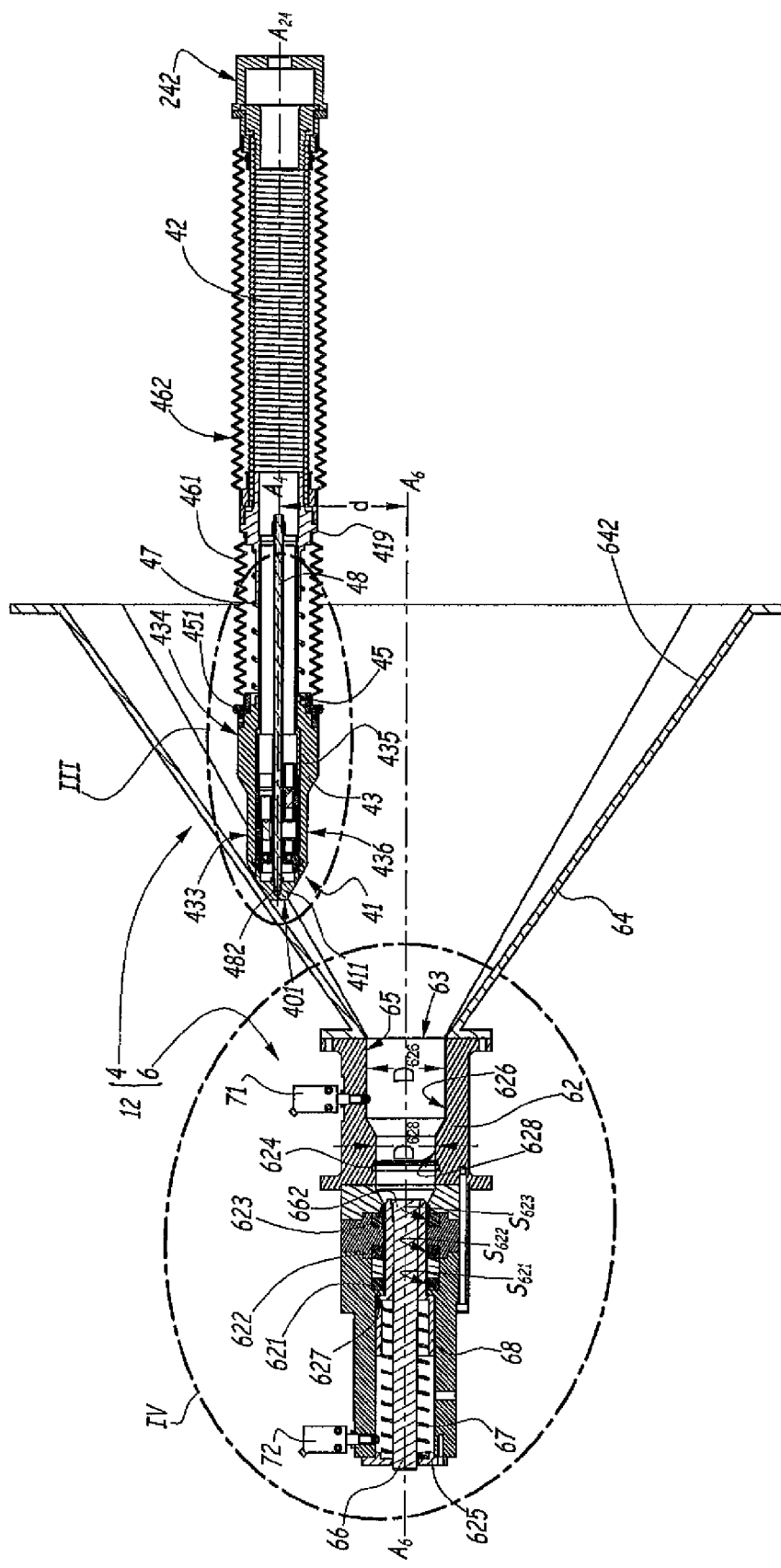
FIG. 2 is a view to a larger scale of the detail II in FIG. 1 in a first configuration of the connection assembly and during electrical connection of the male element and the female element.

FIG. 1 shows a bus 2 provided with a male electrical connection element 4 having a longitudinal axis $A_4$. The forward direction D of the vehicle 2 is along the longitudinal axis $A_2$ of the vehicle 2. The vehicle 2 is provided with an electric battery 22 which supplies power to an electric motor 21 to drive the vehicle 2. The male element 4 is electrically connected to the battery 22 by wiring means 222 and is connected to the mobile end 242 of an actuator 24 having a longitudinal axis $A_{24}$ via a straight coil spring 42. The spring 42 extends generally along the axis $A_4$ when the male element 4 is in its disconnected configuration, as shown by FIGS. 1 and 2. In FIG. 1, the axes $A_4$ and $A_{24}$ coincide. The actuator 24 is a cylinder including a rod 241 the end 242 of which is mobile in translation along the axis $A_{24}$. The actuator 24 pivots about an axis $Z_2$ perpendicular to the roof 25 of the vehicle 2 and vertical when the vehicle is resting on flat horizontal ground, so that the axis $A_{24}$ is mobile in a plane parallel to the roof 25 of the vehicle 2.

A control unit 20 belonging to the vehicle 2 is electrically connected to the actuator 24 via wiring means 202 and electrically connected to the male element 4 via wiring means 204.

A torsion spring that is not shown is connected to the actuator 24 and is adapted to position the male element 4, when it is not electrically connected, in an initial position in which the axis $A_4$ of the male element 4 is perpendicular to the axis $A_2$ of the vehicle 2. This movement occurs in one of the directions of the double-headed arrow $F_1$ in FIG. 1.

A female element 6 with a longitudinal axis $A_6$ belongs to a fixed charging station 8 disposed in the vicinity of a bus stop and includes an entry cone 64 attached to a body 62 of the female element 6. The entry cone 64 has an internal surface 642. The axis $A_6$ and the axes $A_4$ and $A_{24}$ are parallel and separated by an offset d. This offset d is the projection onto the plane of the figures of the offset between the axes $A_4$ and $A_6$. In practice, misalignment or offsetting of the axes $A_4$ and $A_6$ may occur if the vehicle 2 stops slightly before or after the charging station 8, when the axis $A_2$ of the immobilized vehicle is not perpendicular to the axis $A_6$, when passengers embark or disembark, causing the vehicle 2 to rock, and/or if the road is inclined relative to the axis $A_6$. The offset d represented in FIGS. 1 and 2 corresponds to a particular case in which $A_4$ and $A_6$ are parallel before connection, but an angular offset is possible.

The fixed station 8 includes a capacitor 82 connected to the female element 6 by electrical connection wiring means 821. A control unit 10 controls a switch 662 in the wiring means 821 that selectively connects the capacitor 82 and the female element 6. The capacitor 82 is selectively connected to and supplied with power by an electrical power system 14 that in practice may be a low-voltage electrical distribution system. The control unit 10 controls the switch 662 as a function of signals $S_{71}$ and $S_{72}$ transmitted to the control unit 10 by means of electric cables 710 and 720 and delivered by respective sensors 71 and 72.

A cable 6210 electrically connects the control unit 10 to the female element 6.

The elements 4 and 6 together form an electrical connection assembly 12 enabling selective electrical connection of the capacitor 82 to the battery 22, or more generally connection of a source of electrical power to the battery 22.

FIGS. 2 and 5 to 8 represent four successive configurations of the connection assembly 12 during electrical connection of the male element 4 into the female element 6.

During an approach step that is not shown, after which the male element 4 is in mechanical contact with the female element 6, as shown in the configuration of the connection assembly that may be seen in FIG. 2, the vehicle 2 arrives at the fixed charging station 8 in the direction D and stops there.

The control unit 20 of the vehicle 2 then commands the actuator 24 by means of a signal transmitted via the wiring means 202 so that its mobile end 242 is moved in translation along the axis $A_{24}$ in the direction of the female element 6 until mechanical contact is established between the male element and the internal surface 642 of the entry cone 64 of the female element 6. Mechanical contact is established at a point offset from the axis $A_6$ of the female element because of the offset d. FIG. 2 represents the electrical connection assembly 12 after the approach step described above. The male element 4 and the female element 6 are in a disconnected configuration at this stage.

Figure 3:
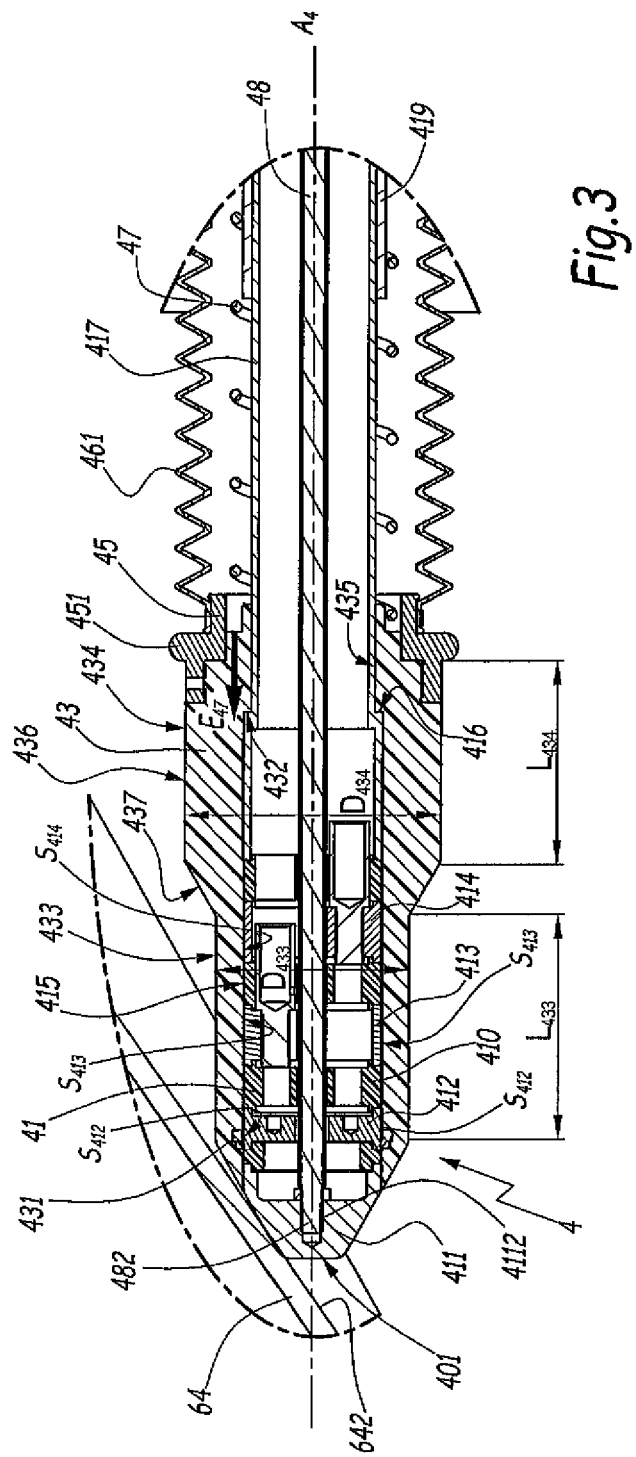
FIGS. 3 and 4 are respectively views to a larger scale of the details III and IV in FIG. 2.
Figure 4:
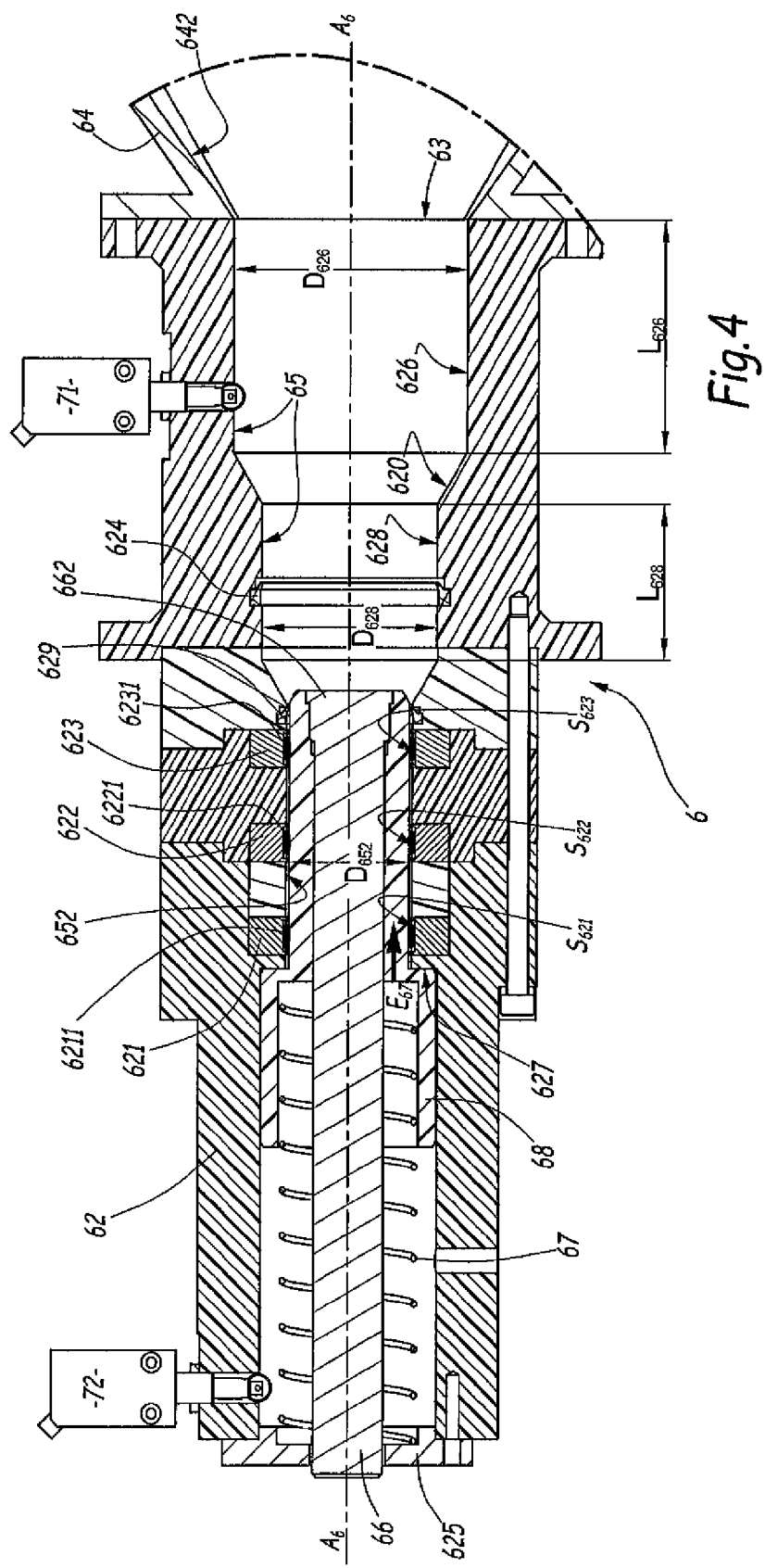

As shown more particularly in FIG. 3, the male element 4 includes a plug 41 surrounded by a sleeve 43. The longitudinal axis $A_4$ of the male element 4 is a central axis common to the sleeve 43 and the plug 41. An internal radial surface 435 of the sleeve 43 has a shoulder 432 and an external radial surface 436 of the sleeve has two stages 433 and 434. The stages 433 and 434 are cylindrical external radial surfaces of circular section with respective axial lengths $L_{433}$ and $L_{434}$ and respective diameters $D_{433}$ and $D_{434}$, connected to each other by a frustoconical surface 437. The stage 433 is situated in the vicinity of a free end 401 of the male element 4 intended to be inserted first into the female element 6 and has an outside diameter smaller than that of the stage 434. The stage 434 is farther away from the free end 401 than the stage 433 and has a length $L_{434}$ shorter than the length $L_{433}$.

The plug 41 is formed by an electrically insulative material tube 410 the end of which situated at the free end 401 is blocked by a frustoconical conductive stopper 411 the section of which reduces in the direction toward the free end 401. The stopper 411 forms the free end 401 of the element 4, projecting axially from the sleeve 43. The end of the tube 410 opposite the free end 401 is fastened to a spacer 417 that includes a shoulder 416 and to which is attached an end support 419. The insulative tube 410, the conductive stopper 411, the spacer 417 and the end support 419 are fastened together and together constitute the plug 41.

The axial length of the spring 42 is globally of the same order as the axial length of the plug 41, i.e. of the same order as the distance between the free end 401 of the male element 4 and the end support 419.

In the disconnected configuration, the area fixing the spring 42 to the end support 419 is offset axially along the axis $A_4$ in the direction of the free end 401 of the male element 4 relative to the area fixing the spring 42 to the mobile end 242 of the actuator 24.

The plug 41 carries on its external radial surface 415 three metal electrical contacts 412, 413 and 414. The electrical contacts 412, 413 and 414 are parallel annular conductive tracks with axis $A_4$ disposed along the axis $A_4$, spaced by the insulative tube 410. The electrical contacts 412, 413 and 414 have respective exterior surfaces $S_{412}$, $S_{413}$ and $S_{414}$ that are flush with the external surface 415 of the plug 41.

In a first axial position of the sleeve 43 relative to the plug 41 represented in FIGS. 1 to 3, 5 and 6, the exterior surfaces $S_{412}$, $S_{413}$ and $S_{414}$ of the contacts 412, 413 and 414 are covered by the sleeve 43. The covering of the contacts 412, 413 and 414 by the sleeve 43 corresponds to the radial overlap of the external radial surface 415 of the plug 41 and the internal radial surface 435 of the sleeve 43, with a functional radial clearance that enables the sleeve 43 to slide axially relative to the plug 41.

An abutment 45 set in around the sleeve 43 at an end of the sleeve 43 opposite the free end 401 extends the stage 434 of the sleeve 43 and includes an external annular portion 451 having an outside diameter greater than the outside diameter $D_{434}$ of the stage 434 of the sleeve 43.

In the disconnected configuration of the male element 4, a return spring 47 pushes the sleeve 43 into the first axial position relative to the plug 41, in which position the internal surface 435 of the sleeve 43 covers the contacts 412, 413 and 414 of the plug 41 and the shoulder 432 of the sleeve 43 bears against the shoulder 416 of the spacer 417. The spring 47 is interleaved axially between the support 419 of the plug 41 and the sleeve 43 and exerts on the sleeve 43 an axial force $E_{47}$ directed towards the first free end 401.

A seal 431 disposed between the plug 41 and the sleeve 43 on the internal radial surface 435 of the sleeve 43 and disposed nearer the free end 401 of the male element 4 than the contacts 412, 413 and 414 forms a sealed barrier that protects the contacts 412, 413 and 414 of the male element 4 from external pollution in the first position of the sleeve 43.

The mobile end 242 of the actuator 24 is connected by the spring 42 to the support 419. The male element 4 is mounted so that it floats relative to the mobile end 242, in the sense that the male element 4 may be inclined to and/or misaligned with the axis $A_{24}$ thanks to elastic bending of the spring 42. In the initial position of the male element 4, the axis of the spring 42 is substantially aligned with the axes $A_4$ and $A_{24}$ and the turns of the spring 42 are contiguous for efficient transmission of the coupling force between the male element 4 and the female element 6.

Figure 5:
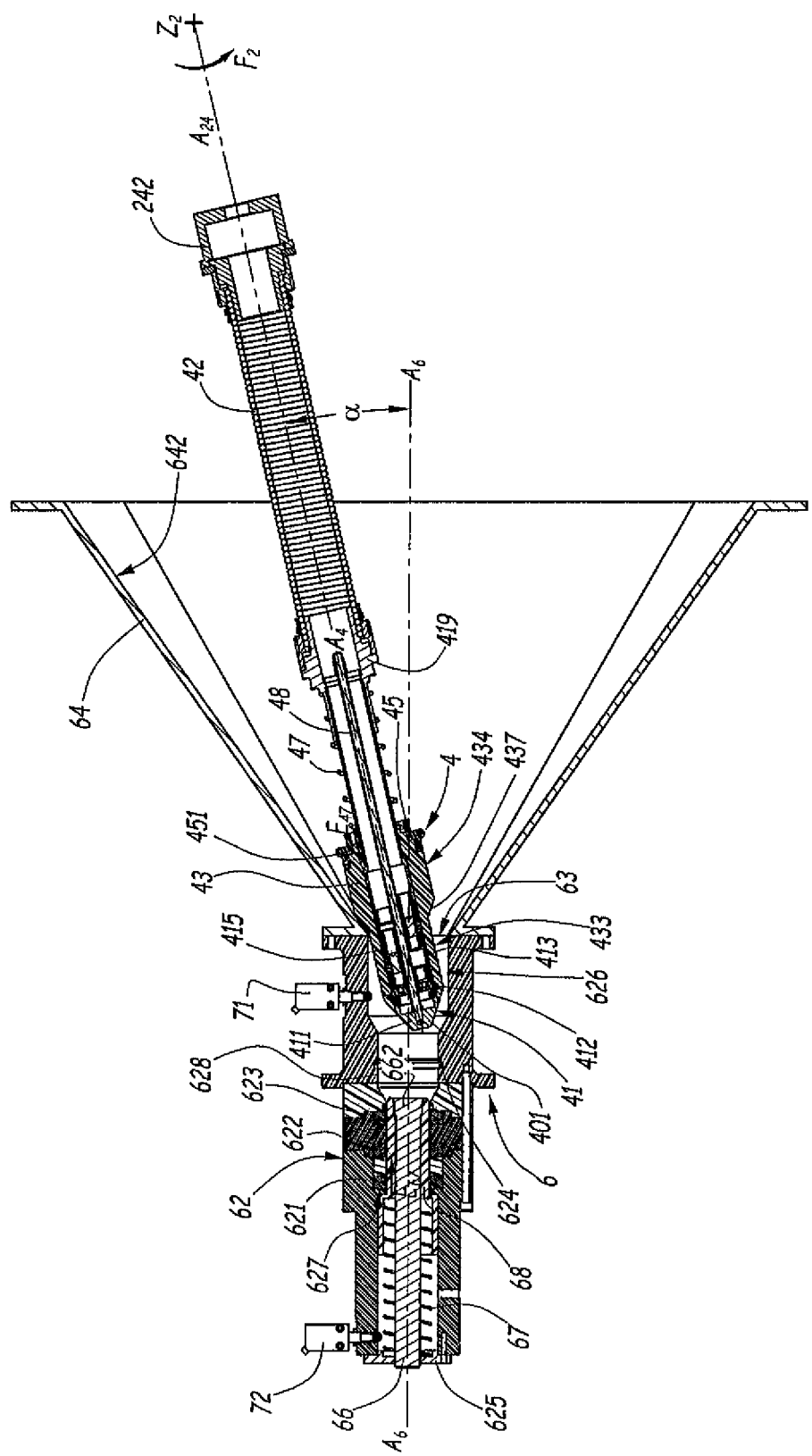
FIG. 5 is a section analogous to FIG. 2 of a second configuration succeeding the first.
Figure 6:
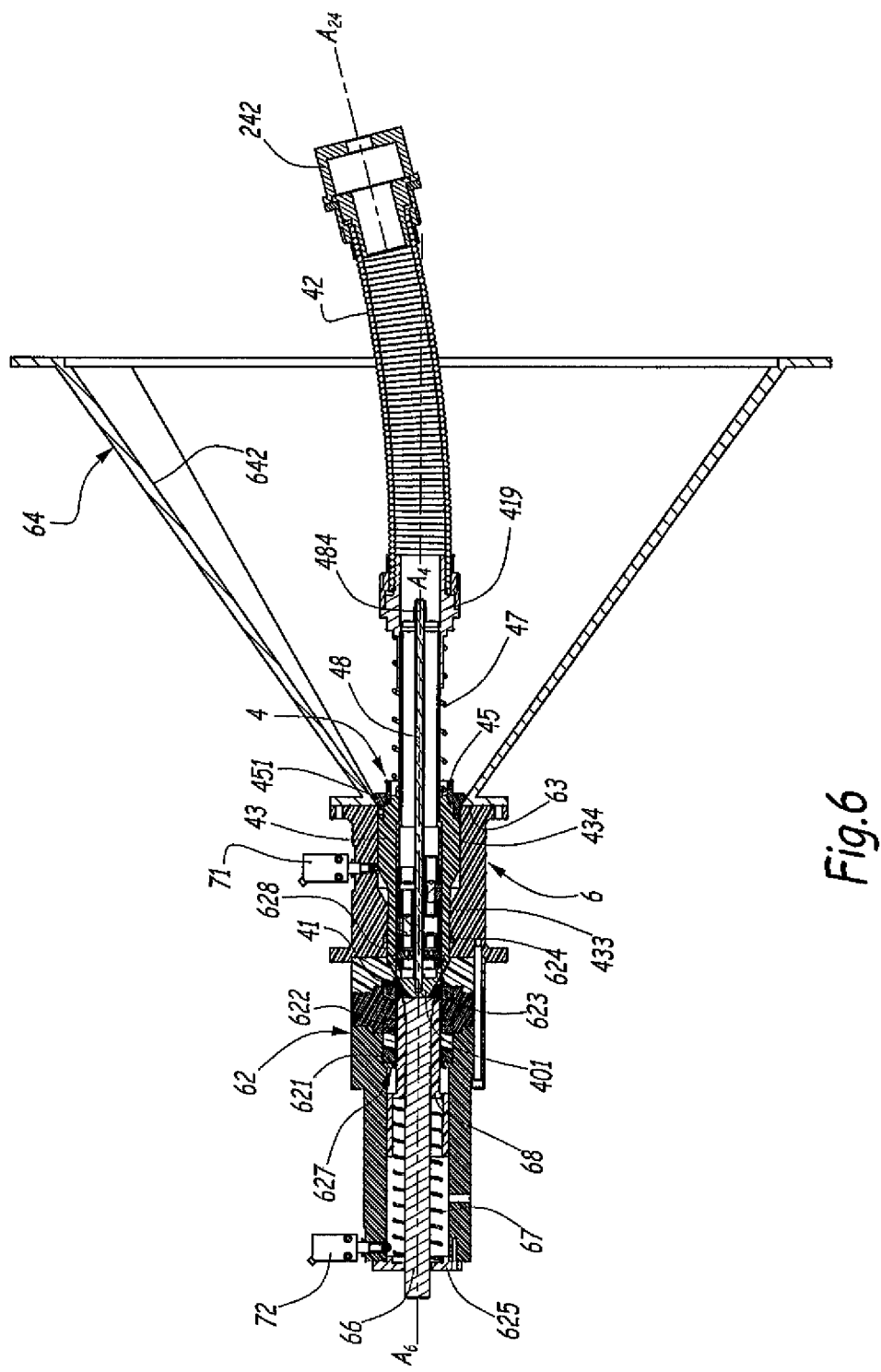
FIG. 6 is a section analogous to FIG. 2 of a third configuration succeeding the second.
Figure 7:
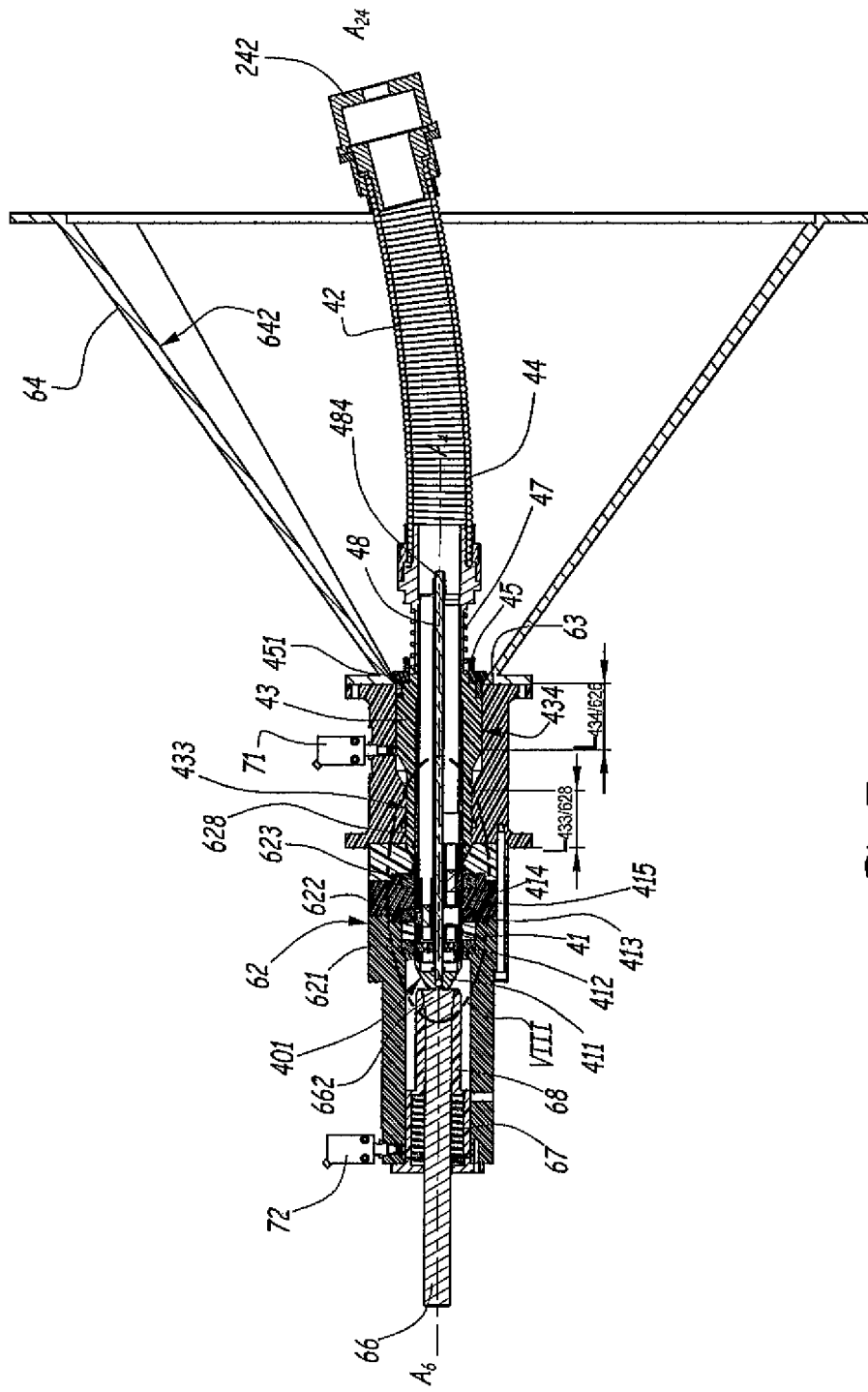
FIG. 7 is a section analogous to FIG. 2 of a fourth configuration succeeding the third, in which the elements of the connection assembly are electrically connected.

A first protective bellows 461, visible in FIGS. 2 and 3 but not shown in FIGS. 5 to 7, is placed around the spring 47. A first end of the bellows 461 grips in sealed manner the abutment 45 and a second end of the bellows 462 grips in sealed manner the support 419. A second protective bellows 462 visible in FIG. 2 but not represented in FIGS. 5 to 7 covers the spring 42 and is interleaved in sealed manner between the plug 41 and the actuator 24, at one end to the end support 419 and at the other end to the mobile end 242 of the actuator 24. The protective bellows 461 and 462 thus protect in sealed manner the male element 4, on the one hand between the support 419 and the sleeve 43, and on the other hand between the support 419 and the mobile end 242 of the actuator 24.

A conductive material earth rod 48 is inserted into the male element 4 inside the plug 41 and the sleeve 43. A first end 482 of the earth rod 48 is screwed into a screwthread 4112 of the stopper 411 and its other end 484 is connected to an earth of the vehicle 2 by an electrical cable that is not shown.

The female element 6 visible in FIGS. 2 and 4 to 8 consists of an insulative body 62 to which is attached at a mouth 63 through which the male element penetrates into the body 62 the smaller diameter end of the entry cone 64 assembled to the body 62 by means that are not shown, such as screws. The section transverse to the axis $A_6$ of the entry cone 64 increases in the axial direction away from the body 62 of the female element 6.

An internal radial surface 65 of the body 62 centred on the axis $A_6$ has two stages 626 and 628 both of which are internal cylindrical surfaces of circular section the respective inside diameters $D_{626}$ and $D_{628}$ of which increase in the axial direction toward the mouth 63 of the female element 6. The stage 626 has a diameter $D_{626}$ greater than the diameter $D_{628}$ of the stage 628 and is axially near the mouth 63. The stage 626 has an axial length $L_{626}$ greater than the axial length $L_{628}$ of the stage 628. The stages 626 and 628 are connected by a frusto-conical surface 620.

Electrically conductive contacts 621, 622 and 623 in the form of annular tracks disposed parallel along the axis $A_6$ and spaced by the body 62 of the female element 6 are situated on the internal surface 65 of the female element 6 and are axially farther away from the mouth 63 than the stages 626 and 628.

A portion 652 of the internal surface 65 that is situated between a far end 625 of the female element 6 and the stages 626 and 628 and which carries the contacts 621, 622 and 623 has the geometry of a cylinder of circular section of diameter $D_{652}$ smaller than the diameters $D_{626}$ and $D_{628}$ of the stages 626 and 628.

The respective exterior surfaces $S_{621}$, $S_{622}$ and $S_{623}$ of the electrical contacts 621, 622 and 623 are flush with the internal surface 65 of the body 62 and carry annular conductive contact elements 6211, 6221 and 6231 of the spring blade contact type which project slightly in the radial direction toward the axis $A_6$ inside the portion 652 of the internal surface 65 of the female element 6.

An insulative mobile flap 68 is disposed inside the female element 6. The flap 68 is spring-loaded toward the mouth 63 of the female element 6 by a spring 67. The spring 67 is interleaved between the far end 625 of the female element 6 and the flap 68 and exerts on the flap 68 an axial force $E_{67}$ directed toward the mouth 63. In the disconnected configuration of the female element 6, the flap 68 is thus pushed against an internal shoulder 627 of the body 62 and radially covers in this first axial position relative to the body 62 the exterior surfaces $S_{621}$, $S_{622}$ and $S_{623}$ of the contacts 621, 622 and 623 of the female element 6.

A seal 629 disposed axially nearer the mouth 63 of the female element 6 than the contacts 621, 622, 623 and disposed between the body 62 of the female element 6 and the flap 68 when it is in its first position forms a sealed barrier that protects the contacts 621, 622 and 623.

A seal 624 extends along the perimeter of the stage 628 and protects the contacts 621, 622, 623, and 412, 413, 414 when the sleeve 43 is fully inserted inside the female element 6.

A conductive earth rod 66 is inserted in the female element 6 radially inside the flap 68. The end 662 of the earth rod 66 facing toward the mouth 63 is flush with the axial side of the flap 68 facing the mouth 63. The rod 66 is connected to an earth of the charging station 8 by an electrical cable that is not shown.

The body 62 of the female element 6 carries the first sensor 71 in the stage 626 and the second sensor 72 in the housing of the flap 68 near the far end 625 of the body 62 of the female element 6.

During a first connection step following the approach step, the outcome of which is represented in FIG. 5, the free end 242 of the actuator 24 continues to move in translation along the axis $A_{24}$. The contact forces between the free end 401 and the entry cone 64 cause the axis $A_{24}$ to pivot about $Z_2$ toward the mouth 63, as shown by the arrow $F_2$ in FIG. 5, and elastically deform the spring 42, if there is an alignment defect, not visible, in a plane perpendicular to the plane of FIG. 2. This deformation and pivoting enable the male element 4 to continue to advance in the direction of the body 62 of the female element 6 with its free end 401 sliding along the internal surface 642 of the entry cone 64. At the end of the first step, the free end 401 and the stage 433 of the sleeve 43 have at least partially penetrated into the stage 626 of the body 62 of the female element 6, as shown in FIG. 5, and the axis $A_4$ of the male element 4 is at an angle α to the axis $A_6$ of the female element 6. The angle α is the result of the offset d between the axis $A_4$ and the axis $A_6$ visible in FIG. 2.

During a second connection step following the first and the outcome of which is represented in FIG. 6, the actuator 24 continues to move the mobile end 242 in translation along the axis $A_{24}$ in the direction of the body 62 of the female element 6. The free end 401 of the male element 4 progresses along the staged internal radial surface 65 of the female element 6 in the direction of the far end 625 and causes bending of the spring 42 for progressive alignment of the axis $A_4$ of the male element 4 with the axis $A_6$ of the female element 6. Firstly, the stage 433 penetrates into the stage 626 with a large radial clearance between the surfaces of these two stages. This radial clearance is the result of the difference between the diameters $D_{626}$ and $D_{433}$. The stage 434 is then engaged in the stage 626 with a small radial clearance after which the stage 433 is engaged in the stage 628 with a small radial clearance, until the sleeve 43 is fully inserted into the body 62 of the female element 6.

The external surfaces of the stages 433 and 434 of the sleeve 43 are substantially complementary to those of the stages 626 and 628 of the internal surface 65 of the body 62. In other words, the stages 433 and 434 of the sleeve 43 have substantially the same diameter as the stages 626 and 628 of the body 62, apart from the functional clearance, so as to allow, on the one hand, engagement of the stages 433 and 434 with the stages 626 and 628 and, on the other hand, axial movement of the sleeve 43 relative to the body 62 of the female element 6. Moreover, the portion 652 of the internal surface 65 of the female element 6 is complementary to the portion of the external radial surface 415 of the plug 41 that carries the contacts 412, 413 and 414.

In the FIG. 6 configuration, the abutment 45 of the sleeve 43 is in contact with the female element 6, at the level of the entry cone 64, and the annular portion 451 of the abutment 45 immobilizes the sleeve 43 against movement in translation in the direction of the far end 625 of the body 62 of the female element 6. In this configuration, because it is pushed back by the sleeve 43, the sensor 71 is activated and detects that the sleeve 43 is abutted against the female element 6 and thus fully inserted.

In the fully inserted configuration of the sleeve 43, the smaller diameter stage 433 of the male element 4 is inserted into the smaller diameter stage 628 of the female element 6 and the stage 433 overlaps the stage 628 over a length $L_{433/628}$. Similarly, in this configuration, the larger diameter stage 434 of the male element 4 is inserted into the larger diameter stage 626 of the female element 6 and the stage 434 overlaps the stage 626 over a length $L_{434/626}$. The axial overlap length $L_{434/626}$ is greater than the axial overlap length $L_{433/628}$, which makes it possible for the larger diameter stages 434 and 626 to cooperate before the smaller diameter stages 433 and 628. In this way, when connecting the male element 4 to the female element 6, jamming of the male element 4 in the female element 6 is prevented and guiding of the sleeve 43 in the female element 6 is facilitated. The frustoconical portion 437 of the male element 4 and the frustoconical portion 620 of the female element 6 have the same angle at the tip and also make it possible to prevent jamming and facilitate guidance of the sleeve 43 in the female element 6 during connection.

The seal 624 then protects the contacts 621, 622 and 623 of the female element 6 by preventing foreign bodies and moisture penetrating into the female element 6. The stage 433 of the sleeve 43 cooperates with the seal 624 before the flap 68 is pushed back by the plug 41 and the seal between the flap 68 and the body 62 at the level of the seal 629 is broken. The spring 42 is then, if necessary, curved and allows alignment of the axis $A_4$ of the male element 4 with the axis $A_6$ of the female element 6, whereas the axis $A_{24}$ of the actuator 24 is misaligned with the axis $A_4$, the actuator 24 continuing to transmit a connection force to the male element 4.

In a third connection step following the second, the outcome of which is represented in FIG. 7, the actuator 24 continues to move the mobile end 242 in translation in the direction of the body 62 of the female element 6 and exerts a force antagonistic to the force $E_{47}$ that is compressing the spring 47. The plug 41 then moves axially relative to the sleeve 43 and continues to move in translation in the direction of the far end 625 of the female element 6 until the end support 419 abuts against the sleeve 43. The plug 41 has then pushed the mobile flap 68 back in the direction of the far end 625 of the female element 6 by compressing the spring 67 until the mobile flap 68 reaches a second axial position represented in FIGS. 7 and 8 in which it pushes on and activates the second sensor 72 and in which the flap 68 no longer radially covers the exterior surfaces $S_{621}$, $S_{622}$ and $S_{623}$ of the contacts 621, 622 and 623. This uncovers the contacts 621, 622 and 623.

Figure 8:
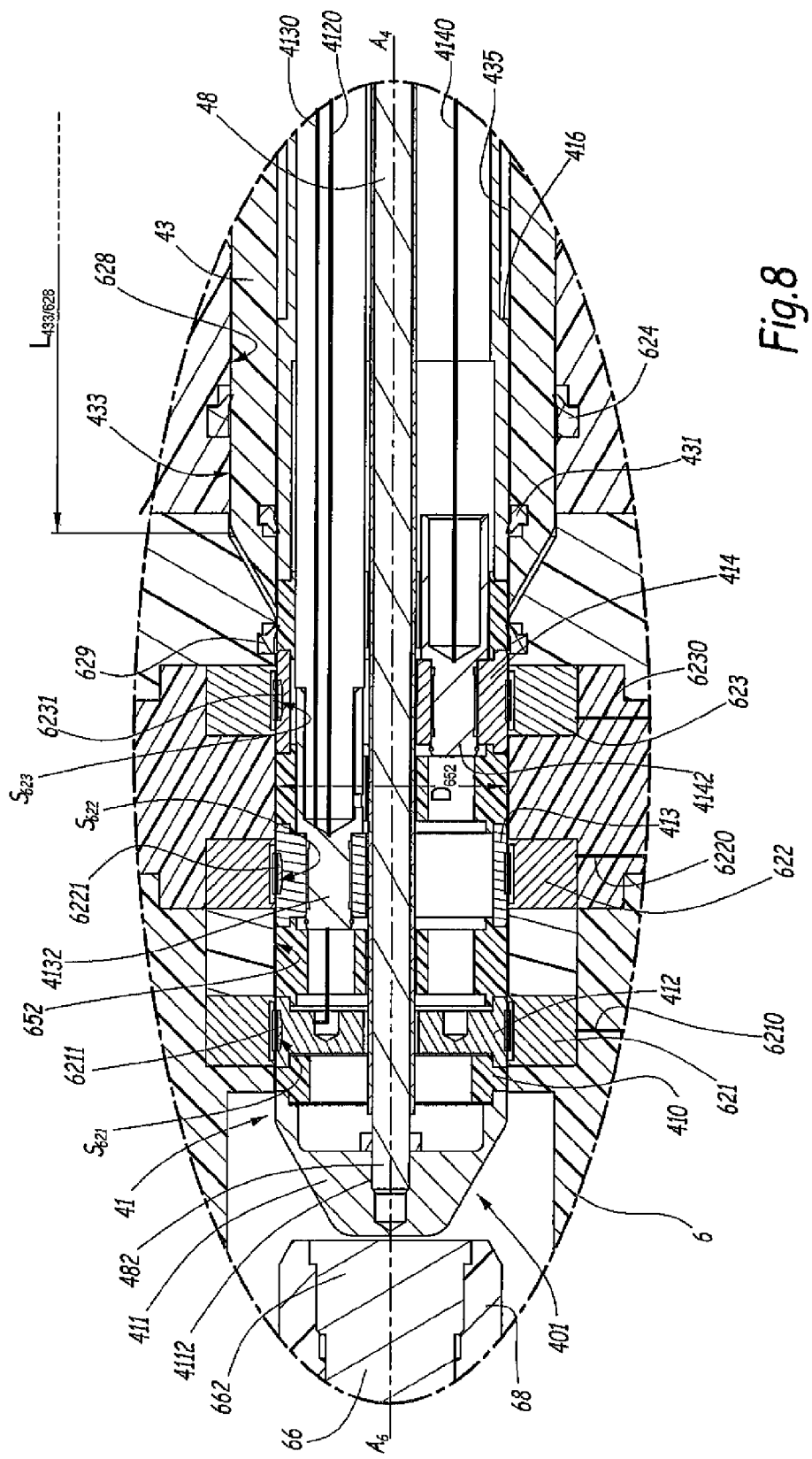
FIG. 8 is a view to a larger scale of the detail VIII in FIG. 7.

In the mechanically connected configuration of the two elements 4 and 6 represented in FIGS. 7 and 8, the sleeve 43 is in the second axial position relative to the plug 41 and no longer covers the electrical contacts 412, 413 and 414 of the plug 41. This uncovers the electrical contacts 412, 413 and 414.

Mechanical and electrical contact is established between the exterior surfaces $S_{412}$ and $S_{621}$, $S_{413}$ and $S_{622}$, and $S_{414}$ and $S_{623}$ of the respective facing contacts 412 and 621, 413 and 622, and 414 and 623 via spring blade contacts 6211, 6221 and 6231. The spring blades of the spring blade contacts facilitate mechanical contact because their elasticity accommodates any angular and/or radial clearance between the male element 4 and the female element 6.

The actuator 24 continues to apply sufficient force to hold the elements of the electrical connection assembly 12 in their positions shown in FIGS. 7 and 8 despite the antagonistic forces $E_{67}$ and $E_{47}$ exerted by the springs 67 and 47. In this configuration, the earth rod 48 of the male element 4 is in contact with the earth rod 66 of the female element 6 via the conductive stopper 411 and the earths of the fixed station 8 and the vehicle 2 are connected.

When the two sensors 71 and 72 are activated, this means that the male element 4 is correctly mechanically connected in the female element 6. Signals $S_{71}$ and $S_{72}$ delivered by the sensors 71 and 72, respectively, transmit the correct connection information to the control unit 10 by means of the cables 710 and 720 visible in FIG. 1.

The control unit 10 then commands closure of the switch 662, which closes the charging circuit described below and energizes the contacts 622 and 623. Charging of the vehicle 2 via the connection assembly 12 begins.

During charging, the capacitor 82 delivers electrical energy to the battery 22 of the vehicle 2 via a loop formed by the following charging circuit: Electrical energy is routed from a first terminal of the capacitor 82 to the contact 622 of the female element 6 by means of the electrical cable 6220. As shown more particularly in FIG. 3, the cables 4130 and 4140 are respectively connected to the contacts 413 and 414 by terminals 4132 and 4142 to which the cables 4130 and 4140 are welded. The electrical energy is then transferred into the male element 4 at the level of the contact 413 and enters the electrical cable 4130, inside the plug 41, the sleeve 43, the support 419, the spring 42 and the mobile end 242 to reach a first terminal of the battery 22. The charging circuit is closed from a second terminal of the battery 22 to a second terminal of the capacitor 82 via the cable 4140, the contact 414, the contact 623 and the cable 6230.

With the cable 4130 the cable 4140 forms the wiring means 222 and with the cable 6230 the cable 6220 forms the wiring means 821.

To clarify the drawing, the cables 4130, 4140, 6220 and 6230 are represented only in FIG. 8. The contacts 621 and 412 are dedicated to communicating information relating to the connection of the connection assembly 12, transmitted by a signal $S_6$ that passes in transit between the control units 10 and 20. Accordingly, the contacts 621 and 412 command earthing at the end of mechanical connection before closure of the switch 662 and command movement of the actuator 24.

The connection information is passed in transit between the control unit 10 and the contact 621 of the female element 6 by means of the cable 6210. The connection information is transferred between the female element 6 and the male element 4 at the level of the electrical interface formed by the contacts 621 and 412 and passes in transit via the cable 4120, accommodated inside the plug 41 and the sleeve 43, which constitutes the wiring means 204, connecting the contact 412 and the control unit 20. For greater clarity, the electrical cables 6210 and 4120 are shown only in FIG. 8.

The control unit 10 interrupts charging after ten seconds of charging by commanding opening of the switch 662, which breaks the supply of electrical power to the contacts 622 and 623. This period is adjustable, notably as a function of the capacitance of the capacitor 82.

After charging is interrupted, the control unit 20 automatically commands the actuator 24 to retract, which drives the male element 4 in a movement that is the reverse of that effected on connection: the plug 41 is retracted into the sleeve 43 and the shoulder 416 of the plug 41 abuts against the shoulder 432 of the sleeve 43, the mobile flap 68 is pushed back by the spring 67, in the direction of the mouth 63 of the female element 6, the electrical contacts 621, 622, 623 and 412, 413, 414 are again covered and protected by the flap 68 and the sleeve 43, respectively, the male element 4 exits the female element 6, and the male element 4 is driven in the direction of the rotation axis $Z_2$ of the actuator 24. The torsion spring that is not shown causes the actuator 24 to pivot about the axis $Z_2$, driving the male element 4 into the initial position. The vehicle 2 is then ready for the next connection.

If the vehicle 2 leaves the fixed station 8 before the end of the charging time, the male element 4 is extracted from the female element 6 thanks to the forward movement D of the vehicle 2 transmitted axially by the spring 42 along the axes $A_6$ and $A_4$, which coincide at this time. This movement of the male element 4 is detected by the sensors 71 and 72 and the control unit 10 interrupts charging by commanding opening of the switch 662 so that the male element 4 and the female element 6 are uncoupled when the contacts 622 and 623 are not live, in order to prevent the formation of electrical arcs. As soon as the movement is detected, the control units 10 and 20 communicate by means of the signal $S_6$ and the control unit 20 commands the actuator 24 so that the mobile part 242 is retracted. Finally, the actuator 24 is pivoted about the axis $Z_2$ and returns the male element 4 to the initial position.

In a variant that is not shown, the male element 4 may be part of the charging station 8 and the female element 6 may be part of the vehicle 2.

In another variant of the invention that is not shown, the external surface 436 of the sleeve 43 and the complementary internal surface 65 of the female element 6 may include the same number of stages greater than or equal to three. In this case, the internal sections of the stages of the female element 6 increase in the axial direction toward the mouth 63 of the female element 6 and the external sections of the stages of the male element 4 decrease in the axial direction toward the free end 401 of the male element 4.

In another variant of the invention that is not shown, each contact of the male element 4 may be provided on the sleeve 43 flush with the internal radial surface 435 of the sleeve 43, the plug 41 then serving to protect and to cover the contact or contacts radially from the inside in a first position of the sleeve 43 relative to the plug 41, whereas the plug 41 may be pushed back in the axial direction into a second position relative to the sleeve 43. In this second position, the plug 41 no longer covers the contacts 412, 413 and 414 of the male element. In this variant, the sleeve 43 is connected to the mobile end 242 of the actuator 24 by the spring 42.

As described above, for fixing it to the actuator 24, the male element 4 includes the spring 42, which is elastically flexible and which allows movement of the end support 242 relative to the plug 41 in a direction that intersects the axis $A_4$. The spring 42 may nevertheless be replaced by another connecting element, which may be a polyurethane type spring, which is also elastically deformable, or by a connecting element articulated to the plug 41 or the sleeve 43 and/or the end support 242. This articulated connection element may be a universal joint or an articulated arm, for example. Whatever form of connecting means may be used, the support 242 to which the connecting element connects the plug 41 or the sleeve 43 is able to move transversely relative to the axis $A_4$. The spring 42 has an intrinsic function of elastically returning the plug 41 of the male element 4 to the initial position in which the axis $A_4$ is globally aligned with the longitudinal axis of the connecting element and with the axis $A_{24}$. However, if the connecting means used do not provide this function, an additional member having this function may be added. Furthermore, whatever the connecting element used, it may be hollow so that at least one electrical cable surrounded by its insulative sheath may be accommodated inside it.

The vehicle 2 in the above description is a bus. However, the present invention may be applied to any mobile, terrestrial or non-terrestrial vehicle.

Furthermore, the electrical receiver of the vehicle 2 receiving the electrical energy during charging need not be a battery.

In the above description and in the figures, the plug 41 consists of a plurality of parts fastened together, which facilitates machining thereof. The plug 41 may nevertheless be in one piece. In the figures, the body 62 of the female element 6 consists of a plurality of parts fastened together. The body 62 may nevertheless be in one piece.

In a configuration that is not represented, the female element 6 may equip the vehicle 2 and be electrically connected to the battery 22 and the male element 4 may equip the charging station 8 and be electrically connected to a source of electrical power.

The control unit 20 of the vehicle 2 may optionally be connected to and control elements of the vehicle 2 other than the actuator 24, for example doors of the vehicle 2.

The invention claimed is:

1. An electrical connection assembly comprising, a female element which includes at least one electrical contact and a male element for inserting into the female element, the male element including a plug that extends along a longitudinal axis ($A_4$), a sleeve that surrounds the plug and that is movable relative to the plug, and at least one electrical contact that is carried by the plug and that is electrically engageable with the at least one electrical contact carried by the female element, an exterior connection surface of the at least one electrical contact of the male element being covered by the sleeve in a first axial position of the sleeve relative to the plug and uncovered in a second axial position of the sleeve relative to the plug, an external radial surface of the sleeve including at least two cylindrical stages each having a circular cross section and having diameters of which are smaller relative to one another in a direction toward a free end of the male element, and the female element including a body having an internal radial surface which includes at least two stages having diameters which are larger in a direction toward a mouth of the female element, and wherein external surfaces of the at least two stages of the sleeve are complementary to external surfaces of the at least two stages of the internal surface of the body of the female element, the at least two stages of the sleeve having respectively substantially the same diameters as the at least two stages of the body of the female element such that when the sleeve is fully inserted in the female element a stage of larger diameter of the male element is engaged in a stage of larger diameter of the female element and a stage of smaller diameter of the male element is engaged in a stage of smaller diameter of the female element.

2. The electrical connection assembly according to claim 1, wherein the male element includes a connecting element for fixing, to a support, an element forming one end of the plug or the sleeve opposite the free end and in that the connecting element allows movement of the support relative to the plug or the sleeve in at least one direction intersecting the longitudinal axis ($A_4$) of the plug.

3. The electrical connection assembly according to claim 2, wherein the connecting element is an elastically deformable element.

4. The electrical connection assembly according to claim 2, wherein the connecting element is articulated to one of the plug or the sleeve.

5. The electrical connection assembly according to claim 2, wherein the connecting element is hollow to accommodate at least one electrical cable therein.

6. The electrical connection assembly according to claim 2, wherein the connecting element extends axially along the longitudinal axis ($A_4$) of the plug.

7. The electrical-connection assembly according to claim 2, wherein spring means are adapted to return the connecting element to an initial position in which the connecting element extends along the longitudinal axis ($A_4$) of the plug.

8. The electrical connection assembly according to claim 1, wherein the male element includes spring means disposed axially between the sleeve and an end element of the plug to urge the sleeve axially toward the first position of the sleeve relative to the plug.

9. The electrical connection assembly according to claim 1, wherein the male element includes at least two electrical contacts in a form of parallel annular conductive tracks disposed along the longitudinal axis ($A_4$).

10. The electrical connection assembly according to claim 1, wherein at least one electrical contact of the male element is on an external radial surface of the plug.

11. The electrical connection assembly according to claim 1, wherein the plug projects axially from the sleeve and constitutes the free end of the male element.

12. The electrical connection assembly according to claim 1, wherein the female element includes a flap movable axially relative to the body of the female element between a first position in which the flap covers the at least one electrical contact of the female element and a second position in which the at least one electrical contact is uncovered by the flap.

13. The electrical connection assembly according to claim 12, wherein the flap has an axial side disposed on a same side as the mouth of the female element and that is made from a conductive material and in that one end of the plug at a same end as the free end of the male element includes a conductive part.

14. The electrical connection assembly according to claim 12, including at least one sensor that detects the mobile flap in the second position thereof and/or the sleeve in a configuration fully inserted inside the female element and in that a control unit is adapted to control the supply of electrical power to the at least one electrical contact as a function of an output signal of the at least one sensor.

15. The electrical connection assembly according to claim 1, wherein, in the fully inserted configuration of the sleeve inside the female element, an axial length over which the stage of larger diameter of the sleeve and the stage of larger diameter of the body of the female element overlap is greater than an axial length over which the stage of smaller diameter of the sleeve and the stage of smaller diameter of the body of the female element overlap.

16. The electrical connection assembly according to claim 1, wherein a first element of a pair of elements consisting of the male element and the female element is electrically connected to a battery and a second element of the pair of elements consisting of the female element and the male element is electrically connected to a source of electrical power that is one of a capacitor or an electrical distribution system.

17. The electrical connection assembly according to claim 1, wherein a first of the elements of a pair of elements consisting of the male element and the female element is mounted on a vehicle and a second element of the pair of elements consisting of the female element and the male element is mounted on a fixed charging station.

18. The electrical connection assembly according to claim 17, wherein the first of the elements that is mounted on the vehicle includes at least one additional electrical contact connected to a control unit of the vehicle.

19. The electrical connection assembly of claim 3 wherein the elastically deformable element is a spring.

* * * * *